Sept. 2, 1958 J. E. ESHBAUGH 2,849,796
DIP STICK
Filed May 31, 1956
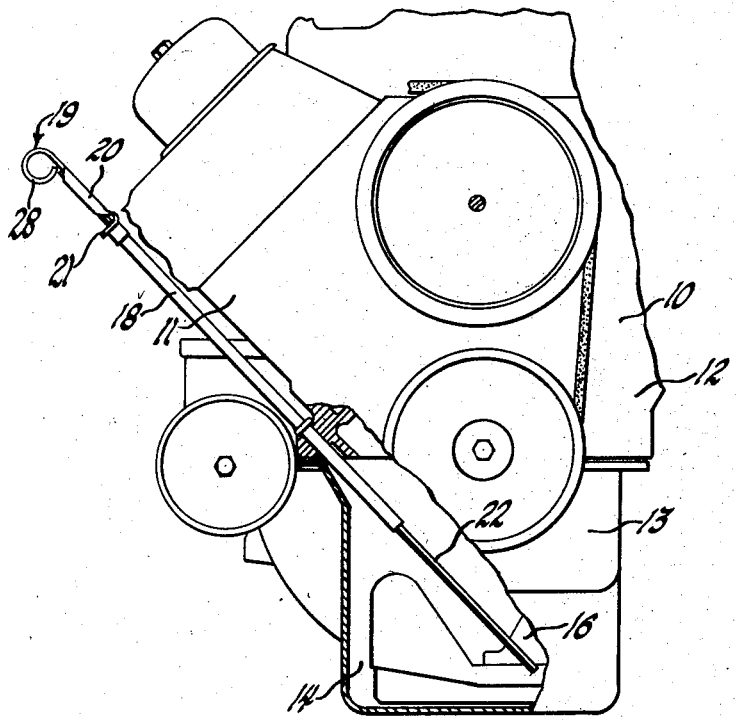
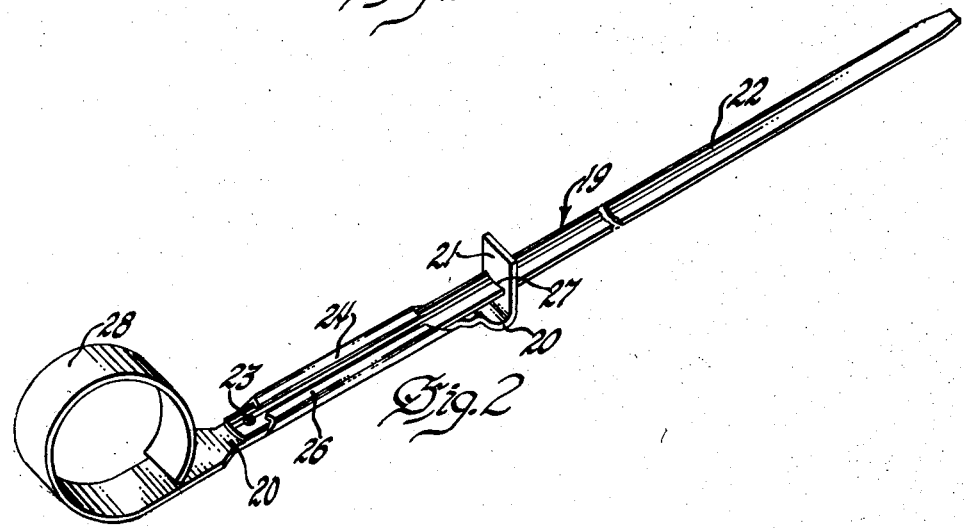
INVENTOR.
Jesse E. Eshbaugh
BY
ATTORNEY

2,849,796

DIP STICK

Jesse E. Eshbaugh, Flint, Mich., assignor to General Motors Corporation, Detroit, Mich., a corporation of Delaware Application May 31, 1956, Serial No. 588,524

2 Claims. (Cl. 33—126.7)

The invention relates to oil dip sticks employed in determining the amount of oil in the oil pan of an internal combustion engine.

It is proposed to provide a dip stick which is inexpensive to manufacture, easy to assemble, that may be compactly stored, and that is adaptable for use in an engine where a passage curving in one direction may be provided.

In the drawings:

Figure 1 is a fragmentary view of an engine in which an oil dip stick embodying the invention is employed. Figure 1 is an end elevational view with a part of the structure broken away to better illustrate the operative position of the dip stick.

Figure 2 is a perspective view of the oil dip stick embodied in the engine illustrated by Figure 1.

The engine 10 employed in illustrating the use of the invention has rows of cylinders 11 formed in an engine block 12, to the lower part of which an oil pan 13 is secured. The oil pan 13 may be of conventional design in which an oil sump 14 is formed at one end thereof to provide a reservoir for containing a large part of the oil required for the operation of the engine. The oil sump also provides room for locating the oil pump 16 employed in circulating the oil from the oil sump 14 to various parts of the engine requiring lubrication.

The engine 10 may be constructed in any suitable manner to provide a downwardly extending passage leading to the part of the oil pan 13 in which the sump 14 is formed. It is sometimes customary to core such passages in the engine block and it is sometimes necessary for reasons of space and accessibility to curve such passages in one direction. In the present instance the passage is formed in a tube or conduit 18 adapted to be secured in a drilled or cored passage formed in a part of the block 12 to which the oil pan 13 is secured. The tube 18 has an outer end terminating near the upper part of the engine in some accessible location. The outer end may be bent in one direction if desired to make the tube more accessible. The lower end of the tube projects into the oil pan 13 in some position within the sump 14 directly opposite an open space at one side or the other of the oil pump 16.

The oil dip stick 19 may be employed in the engine 10 or elsewhere, where an oil sump is employed. As illustrated the dip stick is adapted to be projected into the tube 18 and is provided with a stop 21 adapted to engage the upper end of the tube and to limit the extent to which the dip stick 19 may extend into the oil sump 14. The dip stick 19 consists principally of an elongated transversely curved and flexible steel tape element 22, a stop and handle element 20, and fastening means 23, 24, 26 and 27. The fastening means 27 is an arcuate opening adapted substantially to fit the curvature of the tape 22 and through which the tape 22 may project. The fastening means 24, 26 is a pair of inwardly bent and parallel flanges formed on an elongated part of the element 20. The fastening means 23 is a detent formed on the elements 20 and 22. The element 20 may be elongated as shown and have a laterally bent end forming the stop 21 in which the opening is formed. Also at the end beyond the flanges 24 and 26 the element 20 may be curved to provide a handle 28. The detent 23 may be formed in any suitable manner but in the present instance is formed by a projection on the element 20 adapted to extend into an opening in the tape 22. The dip stick 19 may be assembled by inserting the tape 22 into the opening and by compressing the edges of the tape beneath the flanges 24 and 26. When the opening in the tape 22 reaches the projection formed on the element 20 the projection may be forced beyond the end of the tape and into the opening. It may not be necessary to employ the detent 23 as the compression of the edges of the tape beneath the flanges 24 and 26 may be considered sufficient to retain the elements in assembled relation.

The tape 22 will bend in one direction about a transverse axis extending through the edges of the tape. In all other directions the tape will tend to resist bending. For storage and transit the dip stick may be packed in a box about the size of the element 20. The tape 22 may be disassembled from the element 20 and rolled or folded sufficiently to enable it to be packed in the box at the side of the flanges 24 and 26.

I claim:

1. An oil dip stick for engines comprising a handle and an elongated transversely curved spring tape, said tape being formed to bend easily in one direction throughout the length of said tape and being resistant to bend otherwise than in said direction, said tape normally being substantially straight and being capable of insertion in an elongated dip stick passage formed in an engine and leading to the oil pan of said engine, said handle being formed at one end to provide a bend forming a stop adapted to extend transversely to said tape, said stop being formed to provide a transverse opening for receiving said tape, the edge surfaces of said stop forming said opening being formed to correspond to the curvature of said tape and to engage the opposite surfaces of said tape for maintaining said tape in the transversely curved form of said tape when said tape is inserted in said opening, said handle beyond said stop being formed to provide parallel flanges engaging the edges of said tape and resiliently retaining said tape in said handle when said tape is inserted through said opening and within said flanges, said flanges and said opening being correspondingly formed to receive said tape with said flanges engaging the concave edge surfaces of said tape and with said handle between said flanges engaging the convex surface of said tape, and means for retaining said tape in said handle when said tape is inserted in said opening and within said flanges.

2. An oil dip stick for engines as defined by claim 1 and in which said handle is formed at the end thereof opposite said stop to provide laterally extending means by which to grasp said dip stick when said dip stick is being inserted within or removed from said passage formed in said engine.

References Cited in the file of this patent

UNITED STATES PATENTS

| | | |
|---|---|---|
| 1,475,183 | Harwood | Nov. 27, 1923 |
| 1,501,407 | Le Clair | July 15, 1924 |

FOREIGN PATENTS

| | | |
|---|---|---|
| 361,892 | Germany | Oct. 21, 1922 |